(12) United States Patent
Choi

(10) Patent No.: US 12,374,284 B2
(45) Date of Patent: Jul. 29, 2025

(54) DISPLAY DEVICE WITH VARIABLE POWER CONSUMPTION

(71) Applicant: Google LLC, Mountain View, CA (US)

(72) Inventor: Sangmoo Choi, Palo Alto, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 18/284,442

(22) PCT Filed: Dec. 15, 2022

(86) PCT No.: PCT/US2022/052954
§ 371 (c)(1),
(2) Date: Sep. 27, 2023

(87) PCT Pub. No.: WO2024/129081
PCT Pub. Date: Jun. 20, 2024

(65) Prior Publication Data
US 2025/0087147 A1   Mar. 13, 2025

(51) Int. Cl.
*G09G 3/3233* (2016.01)
*G09G 3/00* (2006.01)

(52) U.S. Cl.
CPC ........... *G09G 3/3233* (2013.01); *G09G 3/006* (2013.01); *G09G 2300/0819* (2013.01); *G09G 2300/0842* (2013.01); *G09G 2310/08* (2013.01); *G09G 2330/022* (2013.01); *G09G 2330/023* (2013.01)

(58) Field of Classification Search
None
See application file for complete search history.

(56) References Cited

U.S. PATENT DOCUMENTS

| | | | |
|---|---|---|---|
| 8,054,257 B2 | 11/2011 | Kwak et al. | |
| 10,718,986 B2 | 7/2020 | Kimura et al. | |
| 2003/0098708 A1 | 5/2003 | Matsueda | |
| 2004/0051469 A1 | 3/2004 | Ha et al. | |
| 2006/0146043 A1 | 7/2006 | Tseng et al. | |
| 2007/0091050 A1 | 4/2007 | Katayama et al. | |

(Continued)

FOREIGN PATENT DOCUMENTS

CN     113253798     8/2021

OTHER PUBLICATIONS

International Search Report and Written Opinion in International Appln. No. PCT/US2022/052954, mailed on Aug. 7, 2023, 33 pages.

(Continued)

*Primary Examiner* — Nicholas J Lee
(74) *Attorney, Agent, or Firm* — Fish & Richardson P.C.

(57) ABSTRACT

In general, the subject matter described in this disclosure can be embodied in methods, systems, and program products for operating a display device. A method of operating a display of a mobile computing device includes transitioning the display of the mobile computing device from a sleep mode to a standby display mode in response to detecting that the mobile computing device tilted by an initial amount; transitioning the display of the mobile computing device from the standby display mode to a normal display mode in response to detecting that the mobile computing device has tilted an additional amount of tilt by a threshold amount of time, the mobile computing device being configured to transition the display from the standby display mode to the sleep mode in response to detecting that the mobile computing device did not tilt the additional amount of tilt by the threshold amount of time.

20 Claims, 8 Drawing Sheets

(56) References Cited

U.S. PATENT DOCUMENTS

| | | |
|---|---|---|
| 2009/0322728 A1 | 12/2009 | Lee et al. |
| 2011/0199397 A1 | 8/2011 | Ko et al. |
| 2012/0001950 A1 | 1/2012 | Kim |
| 2012/0212472 A1 | 8/2012 | Harada et al. |
| 2016/0018872 A1 | 1/2016 | Tu et al. |
| 2016/0078846 A1 | 3/2016 | Liu et al. |
| 2017/0212673 A1 | 7/2017 | Bernstein et al. |
| 2019/0268771 A1 | 8/2019 | Seo et al. |
| 2020/0005712 A1 | 1/2020 | Lee et al. |
| 2020/0380926 A1 | 12/2020 | Douglas et al. |

OTHER PUBLICATIONS

Invitation to Pay Additional Fees and, Where Applicable, Protest Fee in international Appln. No. PCT/US2022/052954, mailed on Jun. 26, 2023, 20 pages.

Kar, "9 tips to improve battery performance on Wear OS Fossil Gen 5 or 6 watch," My Healthy Apple, Aug. 30, 2023, 12 pages.

Office Action in European Appln. No. 22850804.0, mailed on Aug. 23, 2024, 7 pages.

DISPLAY DEVICE WITH VARIABLE POWER CONSUMPTION

CROSS-REFERENCE TO RELATED APPLICATION

This application is a National Stage Application under 35 U.S.C. § 371 and claims the benefit of International Application No. PCT/US2022/052954, filed Dec. 15, 2022, the disclosure of which is incorporated herein by reference.

TECHNICAL FIELD

This document generally relates to display devices.

BACKGROUND

Electronic devices can include display devices on which visual images are shown. In some cases, when an electronic device is stationary, the display can enter an "off" or "sleep" mode. The display can wake from the sleep mode in response to a triggering event, such as in response to detecting motion of the device. For example, an electronic device can be a wearable device that is worn on a user's wrist. When the tilting motion is detected, the electronic device can power on the display to show images on the display.

SUMMARY

This disclosure describes techniques, methods, systems, and other mechanisms for providing a display device that can operate in a higher power consumption mode (e.g., a normal display mode) and a reduced power consumption mode (e.g., a standby display mode). The disclosed techniques can be used to implement a display standby mode, for example to reduce tilt-to-wake latency in displays, such as displays of wearable devices.

The disclosed techniques can be implemented in display systems, e.g., AMOLED display systems. When a display of an electronic device is in an always-on-display (AOD) mode in which the display presents partial or simplified UX images, the display can transition to a normal "on" display mode quickly, e.g., within one to two frame times. When the display is in a sleep mode, the display typically transitions to a normal display mode more slowly, compared to transitioning from the AOD mode. Entering the normal display mode from the sleep mode involves a full display power-on-sequence, increasing the latency. For example, transitioning from the sleep mode to a normal display mode can require six or more frame times.

In some examples, a display system includes multiplexers for routing image data to data lines of pixel circuitry. To reduce the latency to wake the display, the display can enter a standby mode in which a uniform color, e.g., black, is shown across the entire display. In some examples, during the standby mode, source amp and multiplexer circuits of the display are disabled, and the data voltage is supplied by a panel inspection circuit. During the standby mode, the display refresh rate can be reduced, e.g., to a frequency of 10 Hertz (Hz) or lower.

In some examples, a display can enter and remain in a standby mode when the device is not enabled to enter an AOD mode. For example, the device may have settings that are adjustable by a user. The user can adjust the settings so that when the device is stationary for at least a threshold time duration, the display enters the standby mode. As a result, when the device is stationary for at least the threshold time duration, the display enters the standby mode. When a triggering event is detected, such as when user input is received to wake the display, the display transitions from the standby mode to normal mode.

In some examples, a display can enter the standby mode when the device is in a low battery mode. For example, when the battery is at or below a threshold battery level, the device can enter the low battery mode. When the device is stationary in the low battery mode, the display can enter the standby mode in order to reduce power consumption. In some examples, the device may be in the AOD mode, and can transition from the AOD mode to the standby mode when the battery drops to or below the threshold battery level.

In some examples, a device can enter and remain in a standby mode when the display transitions from a sleep mode to a normal mode, when the display transitions from the normal mode to the sleep mode, or both. For example, when a triggering event is detected to wake the display, the display can transition from the sleep mode to the standby mode, and then from the standby mode to the normal mode. When a triggering event is detected for the display to enter the sleep mode, the display can transition from the normal mode to the standby mode, and then from the standby mode to the sleep mode.

In some examples, the system can use two or more triggering events. For example, the first triggering event can be the device tilting a first amount, as measured by tilt angle or tile speed. When the first triggering event occurs, the device can transition from the sleep mode to the standby mode. The second triggering event can be the device tilting a second amount. When the second triggering event occurs, the device can transition from the standby mode to the normal mode.

In some examples, the display can enter a standby mode in response to the display device, or a computing system including the display device, entering a sleep mode. The computing system can be, for example, a personal computer, a mobile telephone, a smart phone, a smart watch, or a smart TV. In some examples, the display device enters a sleep mode when the electronic device experiences low battery levels. Entering a sleep mode reduces power consumption of the device. Transitioning the display to a standby mode can reduce battery consumption of the display, and therefore reduce total power consumption of the device when the device is in the sleep mode.

In the reduced power consumption mode, power consumption of the display can be reduced by ninety percent or more compared to the higher power consumption mode (e.g., the normal "on" display mode). In an example, the display consumes approximately eight milliwatts in the higher consumption mode, five milliwatts in the AOD mode, and one-half milliwatts in the reduced power consumption mode (e.g., the standby mode).

As additional description to the embodiments described below, the present disclosure describes the following embodiments.

Embodiment 1 is directed to a method of operating a display of a mobile computing device, the method comprising: detecting that the mobile computing device has tilted by an initial amount, when the display of the mobile computing device is in a sleep mode; transitioning the display of the mobile computing device to a standby display mode, in response to detecting that the mobile computing device tilted by the initial amount; detecting that the mobile computing device has tilted an additional amount of tilt by a threshold amount of time; and transitioning the display of the mobile computing device from the standby display mode to a normal display mode, in response to detecting that the mobile computing device has tilted the additional amount of tilt by the threshold amount of time, wherein the mobile computing device is configured to transition the display of the mobile computing device from the standby display mode back to the sleep mode in response to detecting that the mobile computing device did not tilt the additional amount of tilt by the threshold amount of time.

Embodiment 2 is the method of any of the preceding embodiments, comprising operating the display, which includes an array of pixels addressed by a set of data lines, in the standby display mode and for a first frame of time, including by: addressing each data line in the set of data lines with a common intensity value using multiplexer bypass circuitry; sending a first scan signal, to a set of pixels within the array of pixels via a scan line, to move the common intensity value from the set of data lines to the set of pixels; and sending a first emission signal, to the set of pixels via an emission line of the display, to activate the set of pixels at intensities based on the common intensity value; and operating the display in the normal display mode and for a second frame of time, including by: addressing the set of data lines with a corresponding set of image data values, using multiple multiplexers to route the set of image data values to the set of data lines; sending a second scan signal, to the set of pixels within the array of pixels via the scan line of the display, to move the set of image data values from the set of data lines to the set of pixels; and sending a second emission signal, to the set of pixels via the emission line of the display, to activate the set of pixels at intensities based on the set of image data values.

Embodiment 3 is the method of embodiment 2, wherein: a power consumption of the display while the display is operating in the standby display mode is lower than a power consumption of the display while the display is operating in the normal display mode, including as a result of the display addressing the set of data lines using the multiplexer bypass circuitry during the standby display mode instead of addressing the set of data lines using the multiple multiplexers during the normal display mode.

Embodiment 4 is the method of any one of embodiments 2 or 3, wherein the common intensity value represents a black intensity value, such that the set of pixels are activated to emit little to no light at the intensity that is based on the common intensity value.

Embodiment 5 is the method of any one of embodiments 2 to 4, wherein: addressing each data line in the set of data lines with the common intensity value using the multiplexer bypass circuitry is performed while the multiple multiplexers are deactivated.

Embodiment 6 is the method of embodiment 5, comprising: sending a signal to the multiple multiplexers to deactivate the multiple multiplexers while each data line in the set of data lines is addressed with the common intensity value using the multiplexer bypass circuitry.

Embodiment 7 is the method of any one of embodiments 2 to 6, wherein each multiplexer of the multiple multiplexers is configured to route image data values to a corresponding subset of data lines within the set of data lines, such that the set of data lines includes multiple subsets of data lines that correspond to the multiple multiplexers.

Embodiment 8 is the method of any one of embodiments 2 to 7, wherein: the multiplexer bypass circuitry includes: a set of switches for the set of data lines, such that each data line in the set of data lines is switchable by a respective switch from the set of switches, and a common intensity data line connected to all switches in the set of switches; and addressing each data line in the set of data lines with the common intensity value using the multiplexer bypass circuitry is performed while the common intensity value is provided to the common intensity data line and the set of switches is closed, so that the common intensity value is provided through the set of switches to each data line in the set of data lines.

Embodiment 9 is the method of embodiment 9, wherein: addressing the set of data lines with the set of image data values is performed while the set of switches is open.

Embodiment 10 is the method of any one of embodiments 8 or 9, wherein: the multiplexer bypass circuitry is configured to enable testing equipment to provide a common testing intensity value to the common intensity data line and through the set of switches to the set of data lines at a facility that manufactures arrays of pixels, without the testing equipment using the multiplexers to route image data values to the set of data lines.

Embodiment 11 is the method of any of embodiments 2 to 10, wherein: the array of pixels includes pixels of a first color, pixels of a second color, and pixels of a third color; the set of data lines is structured to provide image data values to the pixels of the first color; a second set of data lines is structured to provide image data values to the pixels of the second color; and a third set of data lines is structured to provide image data values to the pixels of the third color.

Embodiment 12 is the method of any one of the preceding embodiments, wherein: the transitioning the display to the standby display mode includes transitioning the display from an off display mode to the standby display mode; and wherein the method comprises: determining that an amount of movement of the mobile computing device has not exceeded a threshold amount of movement over a second threshold amount of time, when the display of the mobile computing device is in the normal display mode, and transitioning the display of the mobile computing device from the normal display mode to the off display mode, in response to determining that the amount of movement of the mobile computing device has not exceeded the threshold amount of movement over the second threshold amount of time.

Embodiment 13 is the method of any one of the preceding embodiments, wherein: transitioning the display to the standby mode in response to detecting that the mobile computing device has tilted by the initial amount includes detecting that the mobile computing device has begun tilting, without yet having completed tilting the mobile computing device in a manner that satisfies criteria for transitioning to the normal display mode.

Embodiment 14 is the method of any one of embodiments 2 to 13, wherein: the set of image data values represents image data values for a row of a frame of image data values.

Embodiment 15 is the method of any one of embodiments 2 to 14, wherein: operating the display device in the standby display mode for the first frame of time includes: addressing each data line in the set of data lines with the common intensity value using the multiplexer bypass circuitry; sending a third scan signal, to a second set of pixels within the array of pixels via the second scan line, to move the common intensity value from the set of data lines to the second set of pixels; and sending a third emission signal, to the second set of pixels via a second emission line, to activate the second set of pixels to emit light at the intensity based on the common intensity value; and operating the display device in the normal display mode for the second frame of time includes: addressing the set of data lines with a corresponding second set of image data values, using the multiple multiplexers to route the second set of image data values to the set of data lines; sending a fourth scan signal, to the second set of pixels within the array of pixels via the second scan line, to move the second set of image data values from the set of data lines to the second set of pixels; and sending a fourth emission signal, to the second set of pixels via the second emission line, to activate the second set of pixels at intensities based on the second set of image data values.

Embodiment 16 is the method of embodiment 15, wherein: operating the display device in the standby display mode for the first frame of time includes: sending the first scan signal to the set of pixels and sending the third scan signal to the second set of pixels according to a first frequency, and sending the first emission signal to the set of pixels and sending the third emission signal to the second set of pixels according to the first frequency; and operating the display device in the normal display mode for the second frame of time includes: sending the second scan signal to the set of pixels and sending the fourth scan signal to the second set of pixels according to a second frequency that is higher than the first frequency; and sending the second emission signal to the set of pixels and sending the fourth emission signal to the second set of pixels according to the second frequency that is higher than the first frequency.

Embodiment 17 is the method of any one of embodiments 2 to 16, wherein: addressing each data line in the set of data lines with the common intensity value using the multiplexer bypass circuitry is performed while the digital-to-analog converter remains deactivated, such that the common intensity value is not converted during the first frame of time from digital form to analog form using the digital-to-analog converter; and addressing the set of data lines with the corresponding set of image data values includes converting the image data values from digital form to analog form using a digital-to-analog converter, before the image data values in the analog form are routed to the set of data lines using the multiple multiplexers.

Embodiment 18 is the method of embodiment 17, wherein: addressing each data line in the set of data lines with the common intensity value using the multiplexer bypass circuitry is performed while a memory device configured to store a frame of data values is deactivated and without any frame of image data values being stored by the memory device, such that the common intensity value is not transferred from the memory device as having been selected from any frame of image data stored by the memory device; and addressing the set of data lines with the corresponding set of image data values includes transferring the corresponding set of image data values while in digital form from the memory device to the digital-to-analog converter, with the set of image data values representing a subset of the frame of image data values.

Embodiment 19 is the method of any one of the preceding embodiments, wherein the threshold amount of time is an amount of time passed since: (i) a determined beginning of a tilt, or (ii) the mobile computing device having tilted by the initial amount.

Embodiment 20 is directed to a display device, including: an array of pixels addressable by a set of data lines; multiplexers configured to route image data values to the set of data lines; bypass circuitry that includes: a set of switches for the set of data lines, such that each data line in the set of data lines is switchable by a respective switch from the set of switches; and a common intensity data line connected to all switches in the set of switches; and a display device integrated circuit arranged to: provide image data values to the multiplexers to be routed to the set of data lines; provide a bypass-circuitry activation signal to the set of switches to close the set of switches; and provide a common intensity data value to the common intensity data line while the set of switches are closed to route the common intensity data value to the set of data lines.

Embodiment 21 is a method, comprising: operating a display device, which includes an array of pixels addressed by a set of data lines, in a first mode and for a first frame of time, including by: addressing the set of data lines with a corresponding set of image data values, using multiple multiplexers to route the set of image data values to the set of data lines; sending a first scan signal, to a set of pixels within the array of pixels via a scan line of the display device, to move the set of image data values from the set of data lines to the set of pixels; and sending a first emission signal, to the set of pixels via an emission line of the display device, to activate the set of pixels at intensities based on the set of image data values; and operating the display device in a second mode and for a second frame of time, including by: addressing each data line in the set of data lines with a common intensity value using multiplexer bypass circuitry; sending a second scan signal, to the set of pixels via the scan line, to move the common intensity value from the set of data lines to the set of pixels; and sending a second emission signal, to the set of pixels via the emission line, to activate the set of pixels at intensities based on the common intensity value.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

This document generally describes mechanisms for providing a display device that can operate in different operating modes. A normal mode is a mode in which the display presents user experience (UX) images. A sleep mode is a mode in which the display is off and presents no UX images. An AOD mode is a mode in which the display presents partial UX images, presents reduced resolution UX images compared to the normal mode, presents simplified UX images compared to the normal mode, or any combination of these. A standby mode may be a mode in which the display presents a uniform color throughout the display, in which some components of the display system remain off or steady-state, or both.

A device that includes a display can also operate in various modes. The device can be on, off, or in sleep mode. When the device is off, no power is provided to the display. When the device is in sleep mode or on, power is provided to the display. When the device is in sleep mode, the device consumes less power compared to when the device is on.

When the display is in AOD mode, transitioning from the AOD mode to the normal mode may involve one to two frame times in general (e.g., 16.6 millisecond (ms) to 33.3 ms). When the display is in sleep mode, transitioning from the sleep mode to the normal mode may involve a full display power-on sequence. The power-on sequence includes logic operation, display driver integrated circuit (DDIC) direct current-to-direct current (DCDC) output stabilization time, and panel circuit initialization. This can involve six or more frame times (e.g., 100 ms or greater).

The transition time from the initial mode (e.g., AOD mode or sleep mode) to the normal mode is the display wake-up latency, or lag. In some examples, the wake-up latency can be measured from a start time of receiving a mobile industry processor interface (MIPI) signal from the system-on-chip (SoC) to a start time of addressing pixels of the display. Wake-up latency can be reduced by reducing the DCDC output stabilization time, the panel circuit initializing time, or both.

Figure 1:
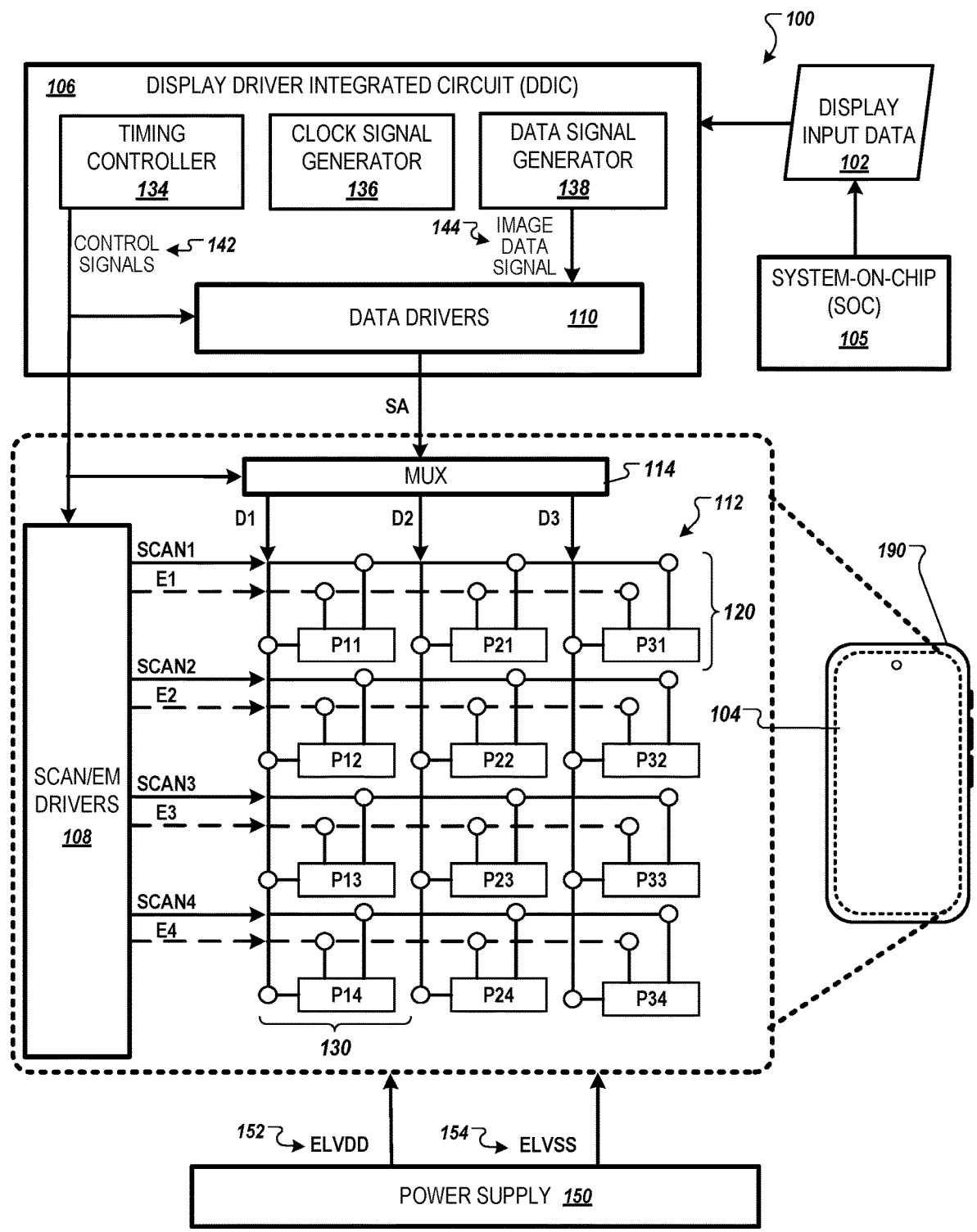
FIG. 1 shows a diagram of an example display system of an electronic device.

FIG. 1 is a diagram of an example display system 100 of computing device 190. The display system 100 is an OLED display system that includes an array 112 of light emitting pixels. Each light emitting pixel includes an OLED. The OLED display is driven by drivers, including SCAN/EM drivers 108 and data drivers 110. The SCAN/EM drivers 108 can be integrated, i.e., stacked, row line drivers. In general, the data drivers 110 provide data signals (e.g., voltage data (VDATA)) to the data lines (e.g., D1-D3), the SCAN/EM Drivers 108 provides a SCAN signal to a selected one of the scan lines (e.g., SCAN1) to move the data signals from the data lines to the pixels in the selected scan line, and the SCAN/EM Drivers 108 provide an EMISSION signal to a selected one of the emission lines (e.g., E1) to light the OLEDs in the selected row according to image data specified by the data signals. Although FIG. 1 illustrates the display system 100 having the SCAN/EM drivers 108 on a single side of the display, the SCAN/EM drivers 108 can be placed on both left and right sides of the display to improve driving performance (e.g., increasing speed by having SCAN drivers on the left side of the display and the EM drivers on the right side of the display).

The pixel array 112 includes a plurality of light emitting pixels, for example, the pixels P11 through P34. A pixel is a small element of a display that can change color based on the image data supplied to the pixel. Each pixel includes an OLED and circuitry to address the OLED with a data value, store the data value, and drive the OLED at an intensity based on the data value (e.g., the components shown in FIG. 2A). Each pixel within the pixel array 112 can be addressed individually to produce various intensities of a color produced by the pixel.

Each pixel maintains a mostly steady luminance throughout a frame time, displaying light corresponding to the supplied image data. A frame time, or frame period, is an amount of time between a start of a frame and a start of a next frame. The frame time can be the inverse of a frame rate of a display system. For example, a frame rate of 60 frames per second (fps) corresponds to a frame time of one-sixtieth of a second, or 0.0167 seconds.

The pixel array 112 extends in a plane and includes rows and columns. Each row extends horizontally across the pixel array 112. For example, the first row 120 of the pixel array 112 includes pixels P11, P21, and P31. Each column extends vertically down the pixel array 112. For example, the first column 130 of the pixel array 112 includes pixels P11, P12, P13, and P14. Only a few pixels are shown in FIG. 1 for simplicity. In practice, there may be thousands or millions of pixels in the pixel array 112. Increasing the numbers of pixels in a display that remains the same size results in a higher image resolution.

The display system 100 includes a display driver integration circuit (DDIC) 106 that receives display input data 102. In some examples, the DDIC 106 receives the display input data 102 from a system-on-chip (SoC) 105. The DDIC 106 can be, for example, a semiconductor integrated circuit or a state machine. The DDIC 106 generates signals with suitable voltage, current, timing, and demultiplexing to cause the display panel 104 to show images according to display input data 102. In some examples, the DDIC 106 can be a microcontroller and may incorporate RAM, Flash memory, EEPROM, ROM, etc.

The DDIC 106 includes a timing controller 134, a clock signal generator 136, and a data signal generator 138. The DDIC 106 generates control signals 142. The control signals 142 can include, for example, signals that control a display frame start time and a display frame stop time of each frame presented by the display panel 104, where a frame represents a single image in a sequence of images that are presented by the display panel 104. In examples in which each frame presented by the display panel includes multiple emission cycles, the control signals 142 or other signals not illustrated in FIG. 1 can control a display emission start time and a display emission stop time of each emission cycle of the display panel 104.

In some examples, the SCAN/EM drivers 108, the data drivers 110, or both, can be integrated with the DDIC 106. The SCAN/EM drivers supply SCAN and EM signals to rows of the pixel array 112. For example, the SCAN/EM drivers 108 supply scan signals via scan lines S1 to S4, and EM signals via EM lines E1 to E4, to the rows of pixels, with each row of pixels in the pixel array 112 being addressed by a scan line and a corresponding emission line. For example, the first row 120 of the pixel array 112 is addressed by scan line SCAN1 and emission line E1.

The data drivers 110 supply signals to columns of the pixel array 112. For example, based on the image data signal 144 from the data signal generator 138, the data drivers 110 output data values via source amp output signal lines SAN (e.g., a set of source amp signal lines SA1, SA2, and SA3) to a set of multiplexers (MUX) 114 in the panel 104. The set of multiplexers 114 in the panel 104 receive data values from a corresponding set of source amp output signal lines SAN, and route the received data values among a greater number of data lines. For example, FIG. 1 illustrates a single multiplexer 114 that is configured to receive a stream of data values from the data driver 110 via the source output signal line SA1, and distribute the stream of data values one at a time among the data signal lines D1-3. In practice there would likely be multiple multiplexers, each being fed with data values from the data drivers 110 via a corresponding source control signal line.

The data drivers 110 supply data voltages via the data lines D1 to D3. In some examples, each of the data lines D1 to D3 represent multiple data lines. For example, the pixel P11 can include three subpixels (e.g., P11R for a red subpixel, P11G for a green subpixel, and P11B for a blue subpixel), and the data line D1 can represent three corresponding data lines, each addressing a corresponding subpixel of pixel P11.

The control signals 142 can be used to drive the SCAN/EM drivers 108 and the data drivers 110. Thus, the DDIC 106 controls the timing of the scan signals, EM signals, and data signals.

The display system 100 includes a power supply 150. The power supply 150 provides a first supply voltage ELVDD and a second supply voltage ELVSS, both of which are provided to each pixel in the pixel array 112. In some examples, the power supply 150 can be integrated with the DDIC 106.

Each pixel in the pixel array 112 is addressable by a horizontal scan line, a horizontal EM line, and a vertical data line. For example, the pixel P11 is addressable by the data line D1, the scan line S1, and the EM line E1. In another example, the pixel P23 is addressable by the data line D2, the scan line S3, and the EM line E3.

The scan lines are addressed sequentially for each frame. A scan direction determines an order in which the scan lines are addressed (e.g., a direction in which rows of pixels receive data values and then light up at intensities based on the received data values). In the display system 100, the scan direction is from a top of the pixel array 112 to a bottom of the pixel array 112. For example, the scan line S1 is addressed first, followed by the scan line S2, then S3, etc. In some implementations, all rows of pixels are programmed with data values using SCAN signals (one row at a time), before the display device activates all rows of pixels at intensities based on the programmed data values. In some implementations, a display device may activate rows of pixels while other rows of pixels are still being programmed, such that there is a gap of a few rows between a row currently receiving a SCAN signal and a row of pixels that is activated and begins emitting light.

While FIG. 1 illustrates that each row is addressed by a single scan line, each row may be addressed by multiple scan lines (e.g., nSCAN and pSCAN). Although FIG. 1 illustrates example components of an OLED display, the described techniques may be applied to other flat panel display technologies that include an array of pixels. For example, the technology may be applied to light emitting diode (LED), liquid crystal displays (LCD), and plasma display panels (PDP).

Figure 2A:
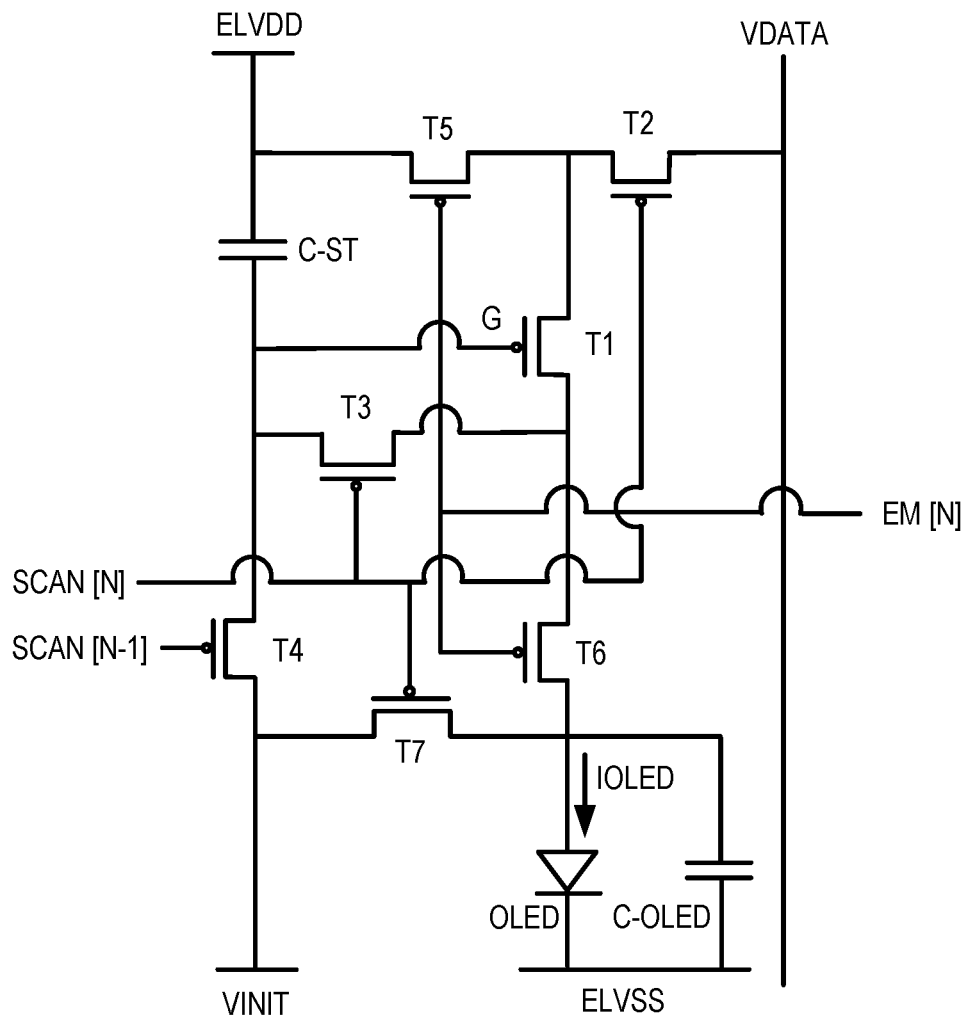
FIGS. 2A and 2B show a diagram of a pixel circuit of a display device and a corresponding timing diagram.

FIG. 2A shows a diagram of a pixel circuit of a display device, which pixel circuit includes an LED and corresponding drive circuitry for the pixel circuit. FIG. 2A may illustrate a more detailed view of a single pixel from the array of pixels shown in FIG. 1. While this disclosure sometimes refers to the components shown in FIG. 2A as a "pixel circuit", this disclosure may also refer to such components as simply a "pixel." Further, the pixel shown in FIG. 2A can represent a sub-pixel.

The pixel circuit may be an active matrix OLED (AMOLED) pixel circuit. The pixel circuit receives an emission signal (EM) on an emission line, SCAN signals on scan signal lines, and a data voltage (VDATA) signal on a data line. The pixel circuit 200 receives a first supply voltage ELVDD on a first voltage supply line, a second supply voltage ELVSS on a second voltage supply line, and an initial reference voltage VINIT on an initial voltage supply line.

The pixel circuit includes an organic light-emitting diode (OLED). The OLED includes a layer of an organic compound that emits light in response to an electric current, IOLED. The organic layer is positioned between two electrodes: an anode and a cathode. The OLED is driven by a driving transistor T1, which receives the supply voltage ELVDD and acts as a current source that drives the OLED to emit light.

The pixel also includes a storage capacitor CST and transistors T2 through T7. The operation of the pixel is defined by states of the control signals SCAN, EM, and VDATA. An amount/level of the OLED current (IOLED) is set by a voltage present at a gate terminal of the driving transistor T1, referred to herein as the "G" node.

The driving transistor T1 has a threshold voltage VTH between the gate terminal of the driving transistor T1 and a source terminal of the driving transistor T1. If the voltage between the gate terminal and the source terminal is above the threshold voltage VTH, the driving transistor T1 creates a conducting path from the source terminal to the drain terminal. An amount of current IOLED that flows through the conducting path through the driving transistor T1 corresponds to an amount that the voltage between the gate terminal and the source terminal is above the threshold voltage VTH.

Figure 2B:
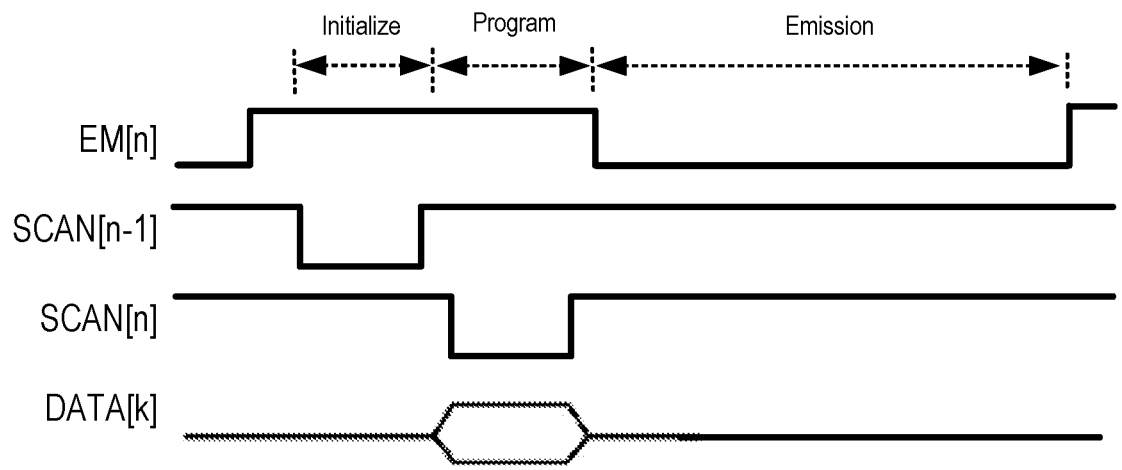

FIG. 2B shows a timing diagram of the control signals provided to and received by the pixel shown in FIG. 2A. These control signals repeatedly transition during operation of the display system 100 between an initialization stage, a programming stage, and an emission stage.

At an end of an emission stage, the EM signal transitions to an off state (e.g., by changing from a low state to a high state). This transition turns off transistors T5 and T6, which interrupts current being provided from ELVDD to the OLED, therefore stopping light emission by the OLED. Since the EM signal may be provided to an entire line of pixels, this transition can turn off all pixels in the line of pixels.

During the initialization stage, the SCAN[n−1] signal turns to an on state (e.g., by changing form a high state to a low state), which turns on transistor T4 for a period of time and initializes the G node to the initialization voltage VINIT. Since the SCAN[n−1] signal may be provided to an entire line of pixels, this initialization stage can erase the data values that were previously stored at each pixel in the line of pixels. The SCAN[n−1] signal may be the SCAN[n] signal provided to a preceding row by a state machine of the SCAN/EM drivers 108.

During the programming stage, the SCAN[n] signal turns to an on state (e.g., by going low), which turns on transistors T2, T3, and T7 for a period of time. This causes the voltage value at the voltage data VDATA line to pass through transistors T2, T1, and T3 to the G node, setting the G node to a value based on the VDATA line (e.g., the voltage at VDATA minus an effect of transistor threshold voltages). Since the SCAN signal may be provided to an entire line of pixels, this programming stage can cause each pixel in the line of pixels to move data voltage values from each pixel's respective data line to the G node of the respective pixel.

During the emission stage, the EM signal turns to an on state (e.g., by going low), which turns on transistors T5 and T6. Current flows from ELVDD through transistors T5, T1, and T6 to an anode of the OLED. Since the EM signal is provided to an entire line of pixels, all pixels in the line of pixels may activate.

A current level provided to the OLED in each pixel is determined by the voltage present at the G node of the pixel (e.g., with the G node voltage level having been programmed by the voltage data VDATA line). An intensity or brightness of light emitted by the OLED directly correlates to an amount of electrical current IOLED applied to the OLED, with higher current corresponding to a greater intensity of light than a lower current. The storage capacitor CST maintains the voltage at the G node, so that the OLED continues to emit light at roughly the same level for a duration of the emission stage.

The voltage at the G node may decrease slightly during the emission stage. As such, the current IOLED applied to the OLED and the intensity of light emitted by the OLED may decrease slightly during the emission stage.

When AOD is not enabled, the display may enter a standby mode when the device is not in use. For example, the display can enter the standby mode when the device is stationary for at least a threshold time duration. In the standby mode, the display shows a uniform color across the display, e.g., black. In the standby mode, fewer than all components of the display system are operating. For example, some components of the display system can remain off or in a steady state, while other components of the display system can operate to address the pixels of the display with black color. In some examples, the operating components of the display system can operate at a reduced frequency in the standby mode, compared to the operating frequency in the normal mode.

A display operating in the standby mode consumes a reduced amount of power, compared to the AOD mode and to the normal mode. A display operating in the standby mode consumes a greater amount of power, compared to the sleep mode. A display operating in the standby mode has a reduced wake latency, or delay time, compared to the sleep mode. A display operating in the standby mode has a greater wake latency, compared to the AOD mode.

Figure 3A:
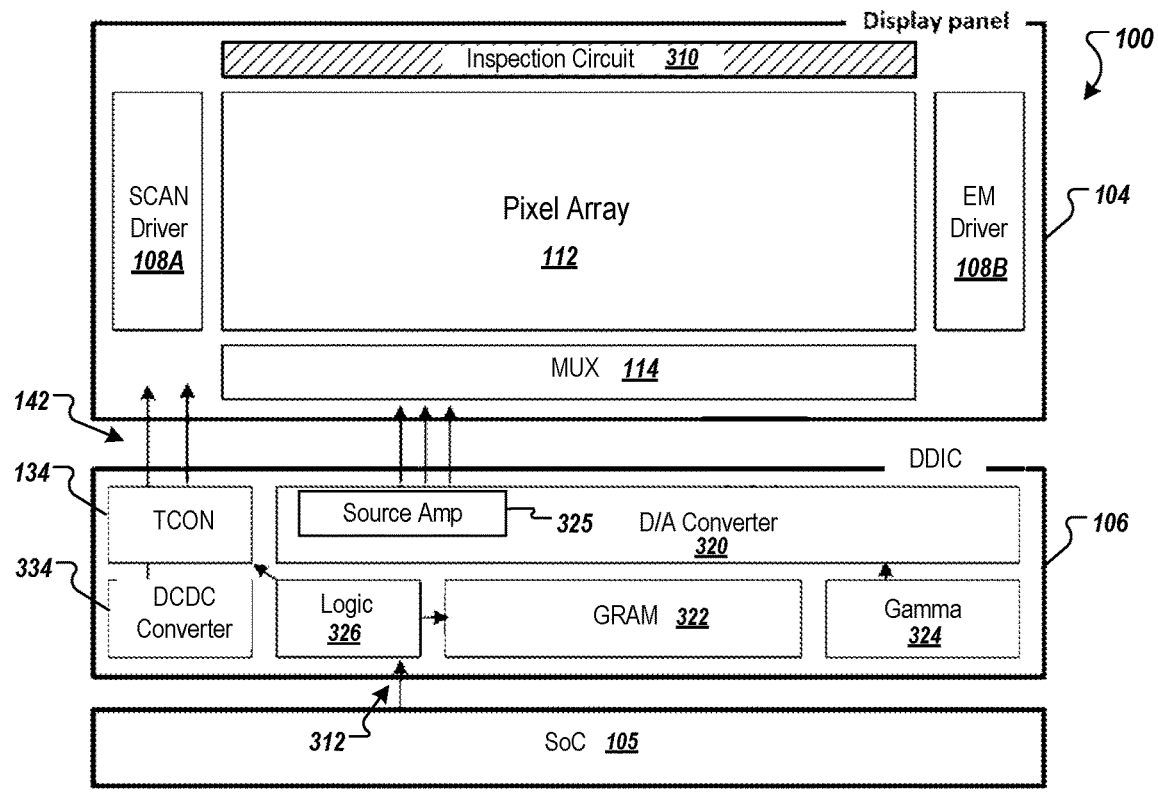
FIG. 3A shows the example display system operating in higher power consumption mode.
Figure 3B:
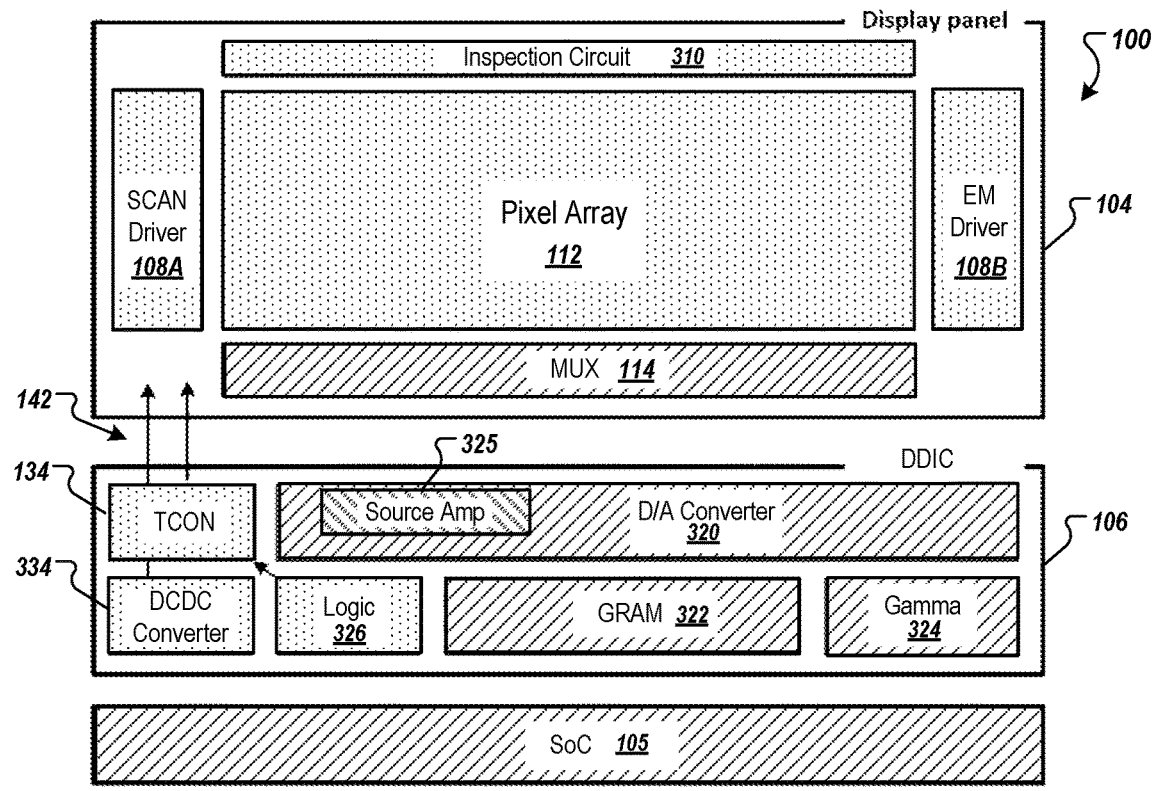
FIG. 3B shows the example display system operating in reduced power consumption mode.

FIG. 3A shows a diagram of an example display system 100 operating in a higher power consumption mode. FIG. 3B shows a diagram of the example display system 100 operating in a reduced power consumption mode. The higher power consumption mode can be, for example, the normal mode of operation in which the display is on. The lower consumption mode can be, for example, the standby mode.

In FIGS. 3A and 3B, components that are in an active state are unshaded. A component that is in an active state can be, for example, a component that is powered on, receiving input, producing varying output, or any combination of these. Components that are in an inactive state are shaded with a diagonal pattern, such as the inspection circuit 310 in FIG. 3A. A component that is in an inactive state can be, for example, a component that is powered off, not receiving input, not producing output, producing steady state output, or any combination of these. Components that are partially active are shaded with a dotted pattern, e.g., the inspection circuit 310 in FIG. 3B. A component that is partially active can be, for example, a component that is operating at reduced power or frequency compared to when the component is in the active state.

The display system 100 includes the display panel 104. The display panel 104 includes the pixel array 112, the multiplexers (MUX) 114, the SCAN driver 108A, and the EM driver 108B. The display panel 104 includes an inspection circuit 310.

The display system includes the SoC 105 and the DDIC 106. The DDIC 106 includes the timing controller 134 and a DCDC converter 334. The DDIC 106 includes a logic circuit 326, a graphing memory (GRAM) 322, a gamma block 324, and a digital-to-analog (D/A) converter 320. In general, the SoC 105, the logic circuit 326, and the GRAM 322 operate at relatively-low voltages, e.g., voltages between approximately two volts and three volts. The DCDC Converter converts the low voltages to high voltages. The timing controller 134, the D/A converter 320, and the gamma block 324 operate at relatively-high voltages, e.g., voltages between approximately five volts and eight volts.

During operation in the higher power consumption mode, the SoC 105 sends commands 312 to the logic circuit 326. The commands 312 can include, for example, MIPI signals, frames of image data, and control signals. The logic circuit 326 receives the commands 312 from the SoC 105. In response to receiving the commands 312, the logic circuit 326 turns on and controls operations of other components of the display system 100.

The power-on sequence of the display system 100 includes logic operation, DCDC output settling time, and panel circuit initialization. Logic operations include the logic circuit 326 turning on components of the DDIC 106 in response to receiving the commands 312 from the SoC 105.

The DCDC output settling time includes the time for the DCDC converter 334 to boost a lower input voltage to a stable higher output voltage. For example, an input voltage to the DCDC converter 334 can be three volts and an output voltage can be six volts. The DCDC settling time is the time for the DCDC converter 334 to boost the input voltage of three volts to a stable output voltage of six volts. The control signals provided to the display panel 104 by the timing controller (TCON) 134 are at the higher voltages generated by the DCDC converter. For example, the control signals include the scan signals, EM signals, and MUX signals. Panel circuit initialization includes initializing voltages of panel circuits. The panel circuit voltages are initialized prior to powering on the display in order to reduce flashing during the first display frame.

The GRAM 322 includes a frame buffer. The GRAM 322 can store data for one image frame. The GRAM 322 provides the image data to the D/A converter 320.

The gamma block 324 outputs reference voltages for the D/A converter 320. In some examples, the gamma block 324 generates eight different reference voltage levels. The eight reference voltages represent intermediate levels between the grayscale values of zero and two hundred fifty-five.

The D/A converter 320 converts the image data received from the GRAM 322 to pixel voltages using the reference voltages from the gamma block 324. The D/A converters 320 converts the image data values from digital form to analog form. A source amp 325 amplifies the output from the D/A converter 320 to drive the display panel 104. The panel 104 receives the image contents via amplified signals from the source amp 325.

The set of multiplexers 114 includes multiplexer activation lines and transistor switches. The multiplexer activation lines are used to control the operation (e.g., the on/off status) of transistor switches based on activation signals received from another component (e.g., the DDIC 106).

During operation in the normal mode, the switches of the set of multiplexers 114 toggle between an on and off state. The set of multiplexers 114 can be turned off, or idled, by setting the multiplexer activation signals to a steady state.

For example, the multiplexer activation signals set to a steady off state can maintain the switches of the multiplexer in an off position.

The DDIC 106 outputs image data values on source amp signal lines for controlling the values of the pixels of the pixel array 112. In some examples, each source amp signal line connects to a set of adjacent data lines via a multiplexer in the set of multiplexers 114. The set of adjacent data lines connected to a source amp signal line can include, for example, six adjacent data lines.

To address pixels with image data, the image data provided by source amp signals line are routed through the set of multiplexers 114 to corresponding data lines. When a scan signal turns on for a row of the pixel array 112, the image data moves from a data line to a subpixel within the row. When an emission signal activates the row, the subpixel emits light at a brightness and color specified by the image data.

Multiplexers of the set of multiplexers 114 can include, for example, one-to-six multiplexers. A one-to-six multiplexer has six outputs for every one input. Some embodiments include multiplexers with more or fewer outputs per input. For example, a display system can include one-to-ten multiplexers having ten outputs for every one input, or one-to-two multiplexers having two outputs for every one input.

The number of multiplexers included in the set of multiplexers 114 can be proportional to the number of subpixels in the rows of the pixel array, the number of data lines in the display, or both. For example, an example display system having six hundred subpixels per row can have six hundred data lines. The display system can include one hundred one-to-six multiplexers, with each of the multiplexers having outputs connected to six of the data lines.

During operation in the higher power consumption mode, the pixels of the display panel 104 are addressed by the scan driver 108A, the EM driver 108B, and the set of multiplexers 114, as described with reference to FIGS. 1 and 2A-B. Image data is provided to the pixel array 112 from the D/A converter 320 through the source amp 325 and the set of multiplexers 114. During the higher power consumption mode, all components of the display system 100 are on, except for the inspection circuit 310, which is off.

FIG. 3B shows a diagram of the example display system 100 operating in a reduced power consumption mode. The reduced power consumption mode can be, for example, the standby mode. In the reduced power consumption mode, components that are used in order to drive the pixels to emit a uniform color are operated in an active state or a partially active state (e.g., unshaded or shaded with a dotted pattern). Components that are not needed in order to drive the pixels to emit a uniform color are in an inactive or off state (e.g., shaded with a diagonal pattern).

During operation in the reduced power consumption mode, some components of the display system 100 are off. For example, referring to FIG. 3B, during operation in the reduced power mode, any of the SoC 105, the GRAM 322, the gamma block 324, the D/A converter 320, and the set of multiplexers 114 can be in an off state. With the pixels emitting a constant, uniform color, the GRAM 222 and gamma block 324 may not be needed to provide new image data to the display panel 104. Therefore, the GRAM 222 and the gamma block 324 are turned off in the reduced power consumption mode.

During operation in the reduced power consumption mode, some components of the display system 100 operate in an active or partially active state. Referring to FIG. 3B, during operation in the reduced power mode, any of the logic circuit 326, the DCDC converter 334, the timing controller 134, the scan driver 108A, the EM driver 108B, the pixel array 112, and the inspection circuit 310 can operate in a partially active state. For example, the timing controller 134 can output the timing signals 142 to the display panel 104 at a reduced frequency, compared to the timing signals 142 output during the higher power consumption mode. The DCDC converter 334 operates to supply the high voltages to the panel circuits.

In some examples, the scan drivers 108A and the EM drivers 108B operate in a partially active state by operating at a lower frequency than in an active state. For example, the scan drivers 108A and the EM drivers 108B can operate at a refresh rate of 10 Hz or less. In the reduced power consumption mode, the set of multiplexers 114, source amp 325, and D/A converter 320 may be inactive, for example, because an analog common intensity value is provided to the pixel array 112 by the inspection circuit 310 instead of by the D/A converter 320. Because the D/A converter 320 is inactive, the common intensity value provided to the pixel array 112 by the inspection circuit 310 is not converted from digital form to analog form using the D/A converter 320 in the reduced power consumption mode.

The inspection circuit 310 is a circuit that is used during the display fabrication, e.g., at a facility that manufactures arrays of pixels. During operation in the higher power consumption mode, the inspection circuit 310 remains idle, or off, while the image data voltages are provided to the pixel array 112 through the set of multiplexers 114. In the standby mode, the inspection circuit 310 is used to provide the image data voltages to the pixel array 112 (e.g., a common image data voltage to all pixels), bypassing the set of multiplexers 114.

Figure 4A:
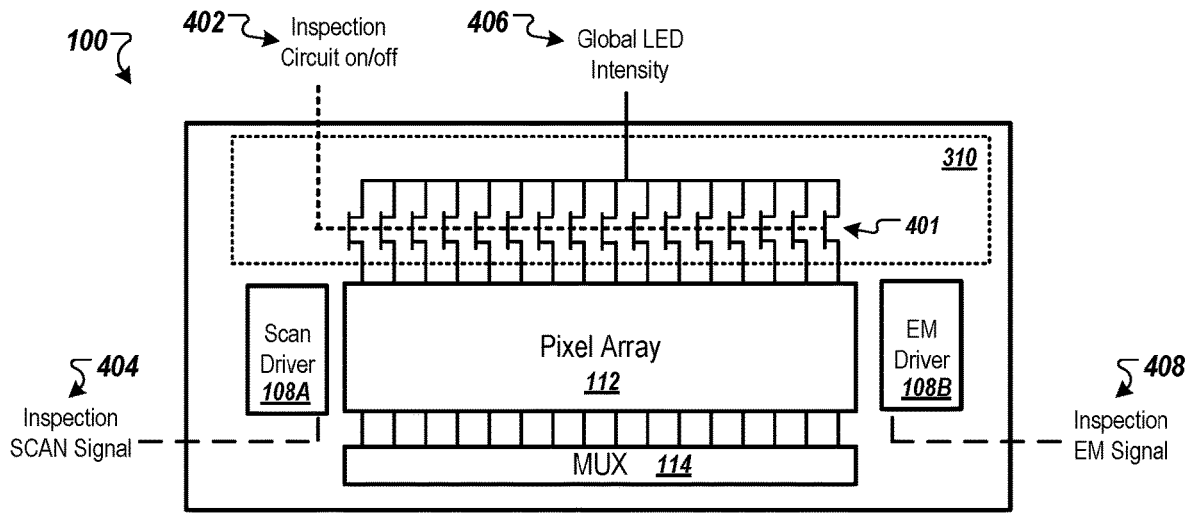
FIG. 4A shows a diagram of inspection circuitry and signals for a display system operating in a test mode.

FIG. 4A shows a diagram of inspection circuitry and signals for the display system 100, while the display system 100 is operating in a test mode. During display panel fabrication, the inspection circuit 310 is used to drive the display panel 104 in order to test operations of the display panel 104. During testing, the inspection circuit 310 supplies data voltages to the pixels of the pixel array 112.

During panel testing, the inspection circuit 310 receives input signals from testing equipment. The input signals can include an inspection circuit on/off signal 402 and a global LED intensity signal 406. The global LED intensity signal 406 is provided to the inspection circuit 310 through a common intensity data line that is connected to all switches 401 of the inspection circuit 310 (e.g., to a gate of each of the switches 401). The testing equipment also provides inspection SCAN signals 404 to the scan driver 108A, and inspection EM signals 408 to the EM driver 108B.

The inspection circuit 310 includes the switches 401. The switches 401 are controlled by the inspection circuit on/off signal 402. The inspection circuit on/off signals 402 controls all switches 401 to be on or off at a given time. Thus, all switches 401 are in a same state at any given time. In contrast, the switches of the set of multiplexers 114 are operated independently and can be operated sequentially, consuming more power compared to the switches 401 of the inspection circuit 310.

The global LED intensity signal 406 controls the LED intensity for all pixels of the pixel array 112. The global LED intensity signal 406 provides a common intensity value that is routed to the pixel array 112 by the inspection circuit 310. The global LED intensity signal 406 can cause the pixels to emit black, white, or red-green-blue (RGB) values of various brightness levels. When the pixel array 112 receives the global LED intensity signal 406 from the inspection circuit 310, and the switches 401 are closed, all pixels receive the common data voltage and therefore all pixels emit light at the same color and brightness.

In some examples, the inspection circuit 310 can drive the pixel array 112 by supplying a global LED intensity signal 406 with a voltage that corresponds to black, in order to show an entirely black display. The inspection circuit 310 can drive the pixel array 112 by supplying a global LED intensity signal 406 with a voltage that corresponds to white, in order to show an entirely white display. The inspection circuit 310 can provide a sequence of SCAN signals via the inspection SCAN signal 404 to route the global LED intensity signal 406 to each line of the pixel array 112, and can provide a corresponding sequence of EM signals via the inspection EM signal 408 to activate each line of the pixel array at an intensity based on the global LED intensity signal 406.

Figure 4B:
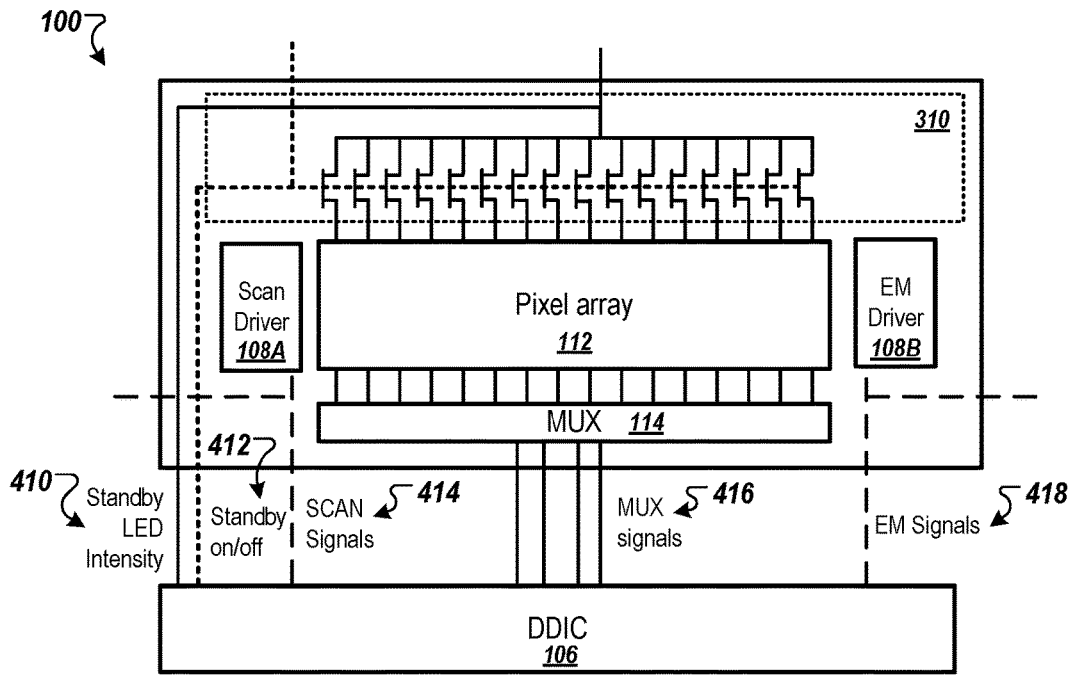
FIG. 4B shows a diagram of inspection circuitry and signals for a display system operating in a reduced power consumption mode.

FIG. 4B shows a diagram of inspection circuitry and signals for a display system operating in a reduced power consumption mode. During the reduced power consumption mode, the inspection circuit 310 is used as multiplexer bypass circuitry, and supplies a common data voltage to the pixels of the pixel array 112, bypassing the set of multiplexers 114. The inspection circuit 310 can be used to address the data lines with a common intensity value while the set of multiplexers 114 are deactivated. The inspection circuit 310 consumes less power than the set of multiplexers 114. Therefore, using the inspection circuit 310 instead of the set of multiplexers 114 to address the pixels of the pixel array 112 reduces the amount of power consumed by the system 100.

During the reduced power consumption mode, the operations of the inspection circuit 310 may be the same as in the testing mode, except that the inspection circuit 310 does not receive input signals from testing equipment. Instead, the inspection circuit 310 receives input signals from the DDIC 106. The input signals can include a standby on/off signal 412 and a standby LED intensity signal 410. The DDIC 106 also provides scan signals 414 to the scan driver 108A, and EM signals 418 to the EM driver 108B (e.g., similar to during normal operation but at a reduced frequency). The DDIC 106 may provide MUX signals 416 to the set of multiplexers 114. The MUX signals 416 can be set to a steady voltage, e.g., a steady high voltage, to maintain the switches of the set of multiplexers 114 in an off state.

The switches 401 are controlled by the standby on/off signal 412. The standby on/off signal 412 controls all switches 401 to be on or off at a given time. The standby LED intensity signal 410 controls the LED intensity for all pixels of the pixel array 112, when switches 401 are controlled to be "on". The standby LED intensity signal 410 can cause the pixels to all emit a black, white, or red-green-blue (RGB) value of various brightness levels. When the pixel array 112 receives the standby LED intensity signal 410 from the DDIC 106, all data columns receive the same data voltage, and as a result of the SCAN signal moving that same data voltage to each line of the pixel array 112 and the EM signal activating each line in the pixel array 112, all pixels emit light at the same color and brightness. For example, the inspection circuit 310 can drive the pixel array 112 to show an all-white display, an all-black display, or a uniform display of another color.

Figure 5A:
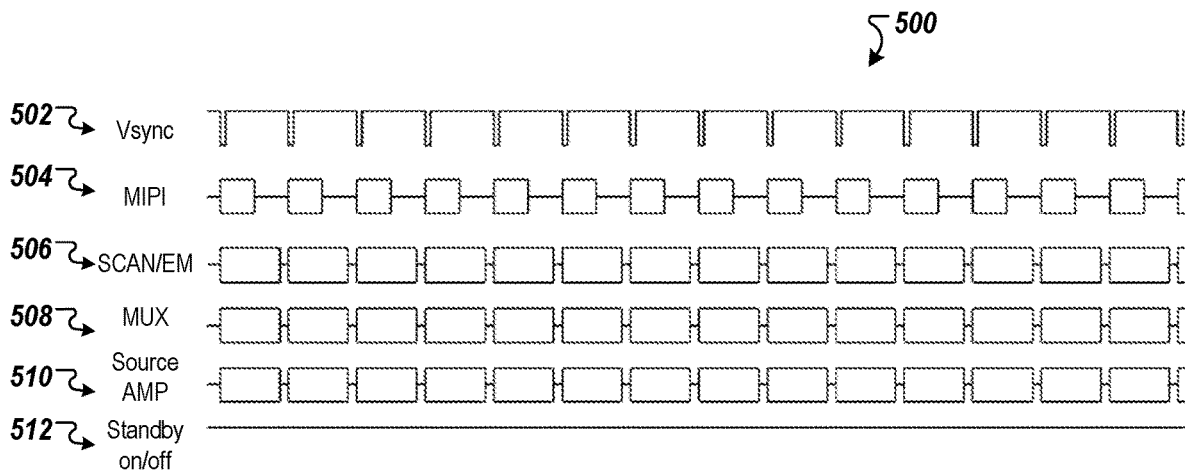
FIG. 5A shows an example timing diagram of a display system operating in a higher power consumption mode.
Figure 5B:
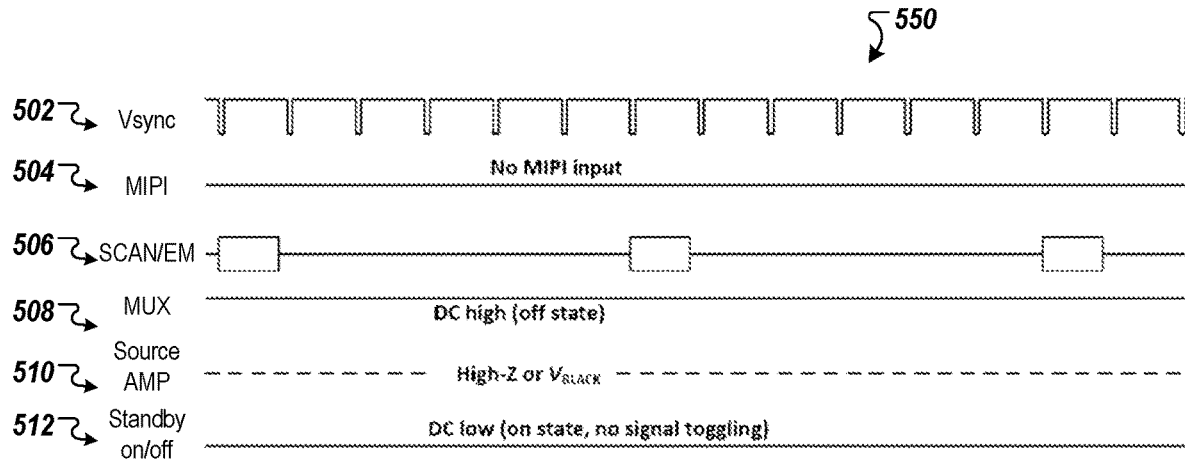
FIG. 5B shows an example timing diagram of a display system operating in a reduced power consumption mode.

FIG. 5A shows an example timing diagram 500 of the display system 100 operating in the higher power consumption mode (e.g., a normal display mode). FIG. 5B shows an example timing diagram 550 of the display system 100 operating in a reduced power consumption mode.

Referring to FIG. 5A, the standby on/off signal 512 from the DDIC 106 remains in a steady off state during the higher power consumption mode. In some examples, the standby on/off signal 512 is in an off state when the standby on/off signal 512 is set to a steady high voltage. The standby on/off signal 512 in the off state cause the switches 401 of the inspection circuit 310 to remain open, or off, such that a common intensity voltage is not routed to all columns of the pixel array 112. Thus, the inspection circuit 310 is maintained in an off state during the high power consumption mode.

Referring to FIG. 5A, in the higher power consumption mode, the DDIC outputs toggling Vsync 502, MIPI signal 504, SCAN/EM signals 506, MUX signals 508, and source amp signals 510. The Vsync is a reference signal that is active once per frame time. MIPI signal 504 is a signal that can wake the display from a sleep mode, and cause the display to remain out of the sleep mode. The MIPI signal 504 is output at regular intervals during the higher power consumption mode. The MIPI signal 504 updates the contents provided to the display panel 104 (e.g., the image to be presented each frame). The MUX signals 508 toggle to cause the switches of the set of multiplexers 114 to turn on and off.

Referring to FIG. 5B, the standby on/off signal 512 from the DDIC 106 remains in a steady on state during the reduced power consumption mode (e.g., the standby mode). In some examples, the standby on/off signal 512 is in an on state when the standby on/off signal 512 is set to a steady low voltage. The standby on/off signal 512 in the on state cause the switches 401 of the inspection circuit 310 to remain shut, or on, such that a common intensity value is routed to all columns of the pixel array 112. Thus, the inspection circuit 310 is maintained in an on state during the reduced power consumption mode.

Referring to FIG. 5B, in the reduced power consumption mode, the DDIC outputs toggling Vsync 502. The MIPI signal 504 is in a steady off state, because the DDIC is not providing new contents to the display panel 104.

In the reduced power consumption mode, the SCAN/EM signals 506 may toggle at a reduced frequency, compared to the higher power consumption mode. This reduces the refresh rate of the display panel. Because the display panel 104 is displaying a uniform color, the reduced refresh rate can be used without disrupting the appearance of the display. The refresh rate can be, for example, ten Hertz.

During the reduced power consumption mode, the source amp signals 510 are in a steady off state. The MUX signals 508 are in a steady off, or high voltage, state. The MUX signals 508 in the steady off state cause the set of multiplexers 114 to remain in a non-cycling state (e.g., disconnected from the columns of the pixel array 112, so that values provided to the columns of the pixel array 112 are not controlled by outputs of the multiplexers 114).

In the reduced power consumption mode, the DDIC 106 sends the standby on signal 512 to inspection circuit 310. The DDIC 106 also sends the standby LED intensity signal 410 to the inspection circuit 310. The standby LED intensity signal 410, can be, for example, a high voltage level that causes the pixels of the pixel array 112 to emit black light.

When the system 100 receives a system interrupt to wake up the display, the display is able to quickly start the transition from the standby mode to the higher power consumption mode. In some examples, the display can initiate the transition to the higher power consumption mode during a frame time, e.g., between a start time and a stop time for a frame.

Figure 6:
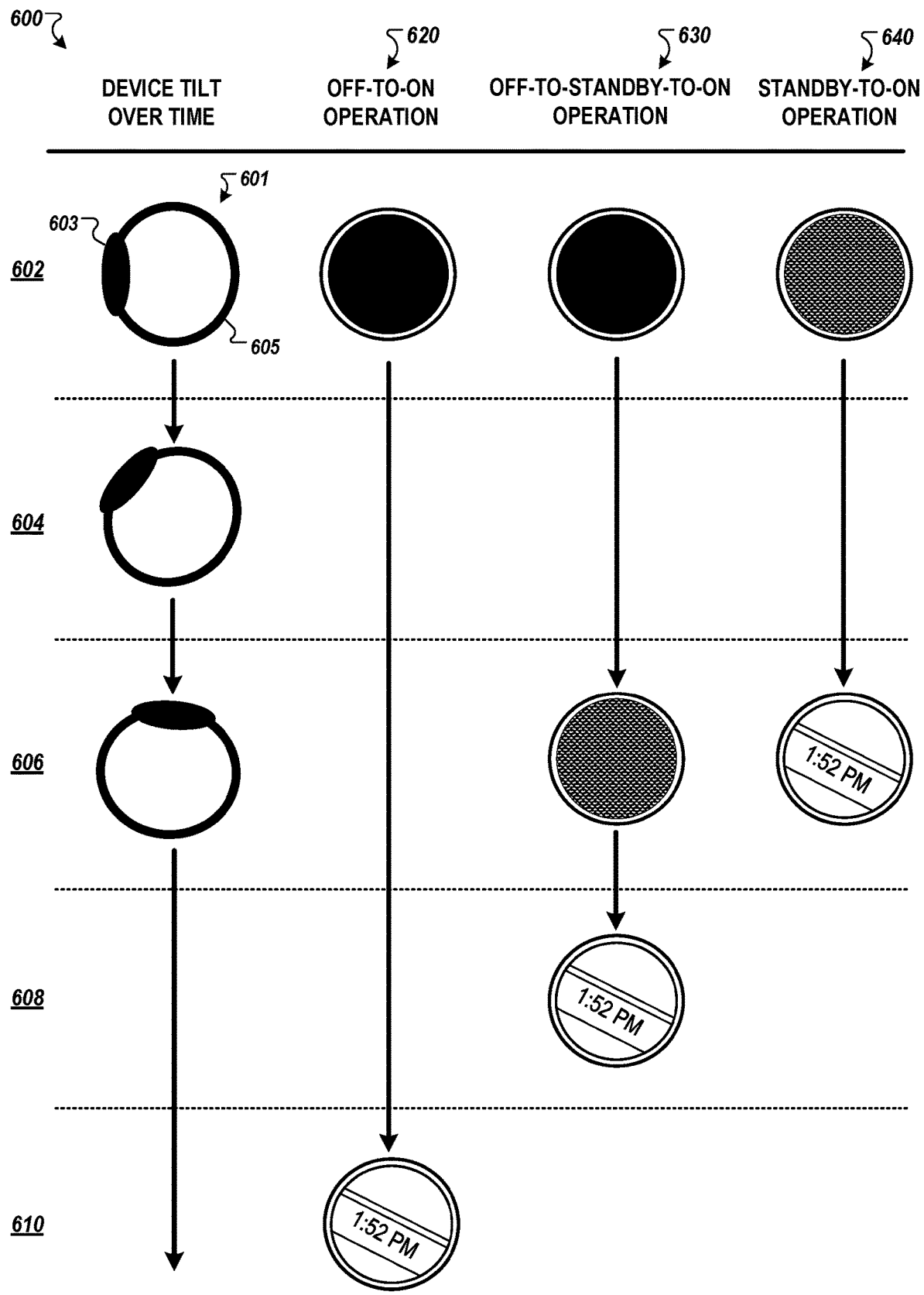
FIG. 6 shows an example timing diagram of a display device transitioning between display modes.

FIG. 6 shows an example timing diagram 600 of a display device transitioning between display modes. In the example timing diagram 600, the display device is a display device of a mobile computing device that is a wristwatch 601. The wristwatch 601 includes a display 603 and a wristband 605. A tilt of the wristwatch 601 changes over time.

At a first time 602, the wristwatch 601 is in a first, untilted position. At a second time 604, the wristwatch 601 is in a second, initial tilted position. In the initial tilted position, the display 603 faces a direction that is at an angle relative to the direction in which the display faces in the untilted position. At a third time 606, the wristwatch 601 is in a third, additionally tilted position. In the additionally tilted position, the wristwatch 601 is tilted at an angle that is greater than the initially tilted position, relative to the untilted position). The wristwatch 601 remains in the third position at the fourth time 608 and the fifth time 610.

Column 620 of the timing diagram 600 shows off-to-on operation for turning on the display device of the wristwatch 601. In off-to-on operation, the display device remains in an off display mode (represented in FIG. 6 by the display panel shaded black) until the wristwatch 601 reaches the third position at time 606. The display device begins to transition from the off display mode to the on display mode (e.g., normal display mode) at time 604 or at time 606, when the wristwatch 601 tilts to the second position or to the third position. Due to the wake latency, the display does not enter the normal display mode until the time 610.

Column 630 of the timing diagram shows an off-to-standby-to-on operation for turning on the display device. In off-to-standby-to-on operation, the display device begins to transition from the off display mode to the standby display mode when the wristwatch 601 reaches the second, initially tilted position at time 604. At time 606, the display device is operating in the standby display mode, represented in FIG. 6 by the display panel being patterned. When the wristwatch 601 reaches the third position at time 606, the display device transitions from the standby display mode to the normal display mode. Transitioning from the standby display mode to the normal display mode occurs more rapidly than transitioning from the off display mode to the normal display mode. At time 608, the display device is operating in the normal display mode. Thus, using off-to-standby-to-on operation, the display device enters the normal display mode at an earlier time, compared to the off-to-on operation.

Column 640 of the timing diagram 600 shows a standby-to-on operation for turning on the display device. In standby-to-on operation, the display device is in a standby mode while the wristwatch 601 is in the first, untilted position at time 602. When the wristwatch 601 reaches the second position at time 604, the display device begins to transition from the standby display mode to the normal display mode. At or soon after the time when the wristwatch 601 reaches the third position at time 606, the display device enters the normal display mode. Thus, using the standby-to-on operation, the display device enters the normal display mode at an earlier time, compared to both the off-to-standby-to-on operation and the off-to-on operation.

Figure 7A:
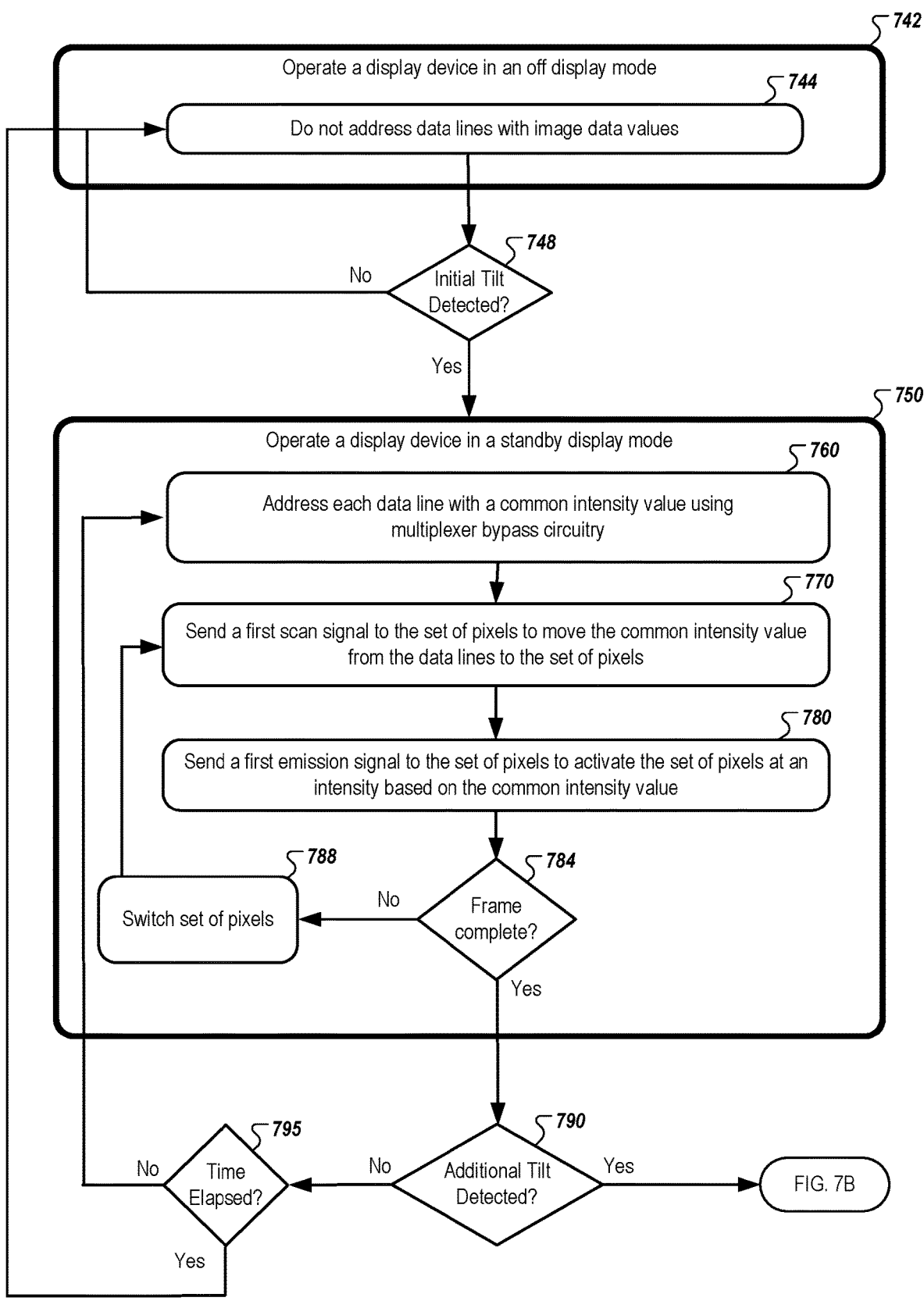
FIGS. 7A and 7B show a flowchart of a process for operating a display device with different operating modes.
Figure 7B:
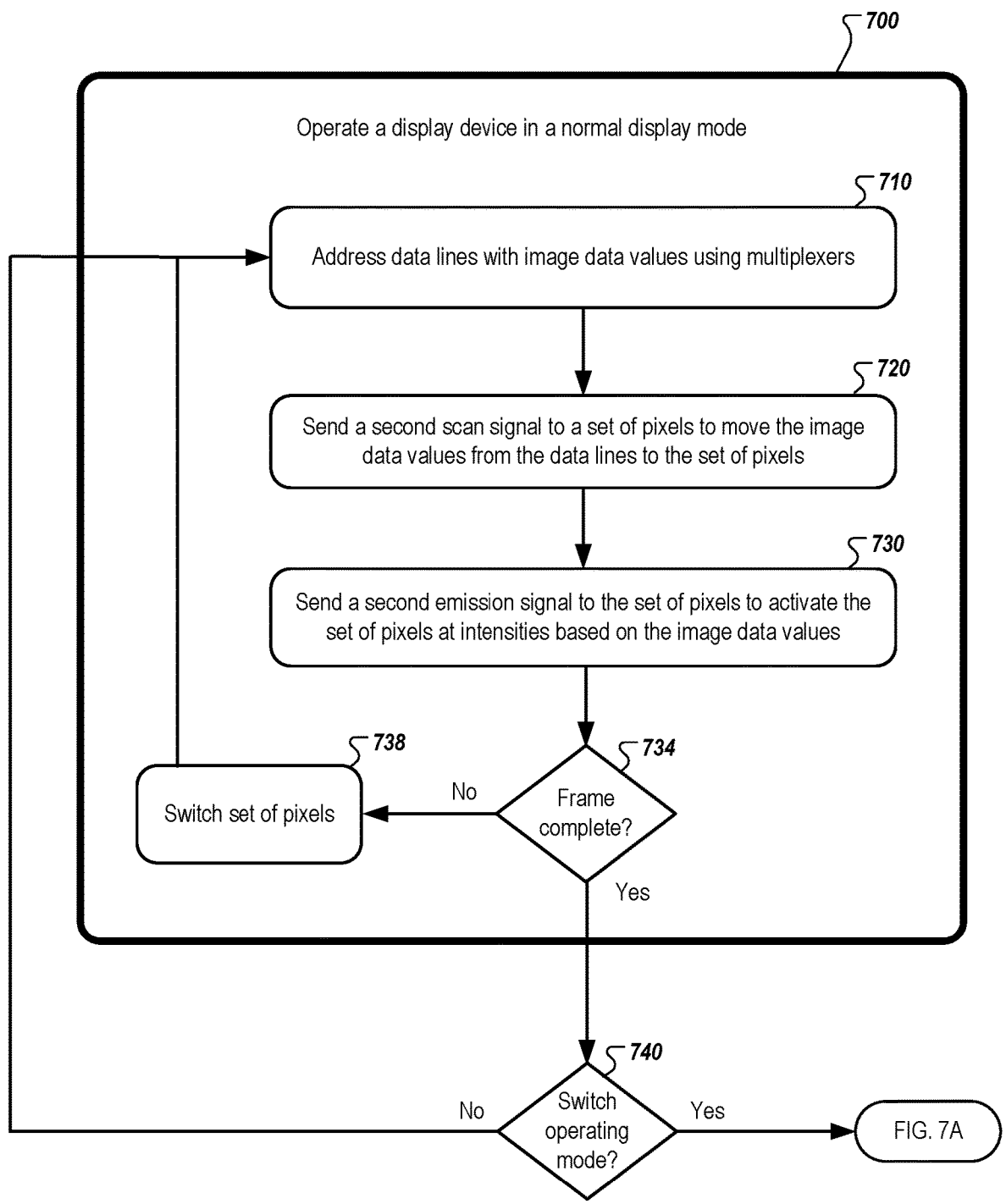

FIGS. 7A-B show a flowchart of a process for operating a display device or system with different operating modes. The process can be implemented by a display system or a computing device that includes the display system, e.g., computing device 190. The computing device may be a mobile computing device.

At box 742, the display device operates in an off display mode. In some examples, the off display mode is a sleep mode of the display device. At box 744, the display device does not address data lines with image data values. At box 748, the display device determines whether an initial amount of tilt is detected. If the display device does not detect the initial amount of tilt, the operations of box 744 are performed again. If the display device does detect the initial amount of tilt, the operations of box 750 are performed. Thus, the display device transitions to a standby display mode in response to detecting that the computing device tilted by the initial amount.

In some examples, the display device can receive a signal indicating that the display device is to switch from being in an off display to operating in the standby display mode as a result of the device detecting partial user input to wake the display device. For example, the device can detect that the device has begun tilting, without yet having completed tilting the display device in the manner that satisfies the criteria for waking the display device. The computing device or the display device located therein may determine to switch from being off to the second, reduced power consumption mode.

At box 750, the display device operates in a standby display mode that is a reduced power consumption mode. The reduced power consumption mode is adapted to present image content with reduced power consumption in comparison to when the display device is in the higher power consumption mode. In some examples, the DDIC 106 can receive a signal from the SoC 105 instructing the DDIC 106 to enter a reduced power consumption mode. In some examples, the DDIC 106 receives a signal from the SoC 105 indicating that the device 190 has entered a standby mode. In response to receiving the signal indicating that the device 190 has entered the standby mode, the DDIC can determine to operate in the reduced power consumption mode.

At box 760, the display device addresses each data line in the set of data lines with a common intensity value using multiplexer bypass circuitry (e.g., without addressing each data line with outputs of the multiplexers). For example, the DDIC 106 can address the set of data lines including data with the standby LED intensity signal 410, using the inspection circuit 310 as multiplexer bypass circuitry. The standby LED intensity signal 410 addresses the set of data lines with a common intensity value. In some examples, the common intensity value is a black intensity value.

At box 770, the display device sends a second scan signal to the set of pixels via the scan line to move the common intensity value from the set of data lines to the set of pixels. For example, the DDIC 106 can send a scan signal 414 to the scan driver 108A to move the common intensity value from the data lines to a single line of pixels of the pixel array 112.

At box 780, the display device sends a second emission signal to the set of pixels via the emission line to activate the set of pixels to emit light at an intensity based on the common intensity value. For example, the DDIC 106 can send an EM signal 418 to the EM driver 108B to activate the single line of pixels of the pixel array 112. In some examples, the common intensity value represents a black intensity value, and the pixels of the pixel array 112 are activated to emit little to no light at the intensity that is based on the common intensity value.

At box 784, the display device determines whether an entire frame of data has been completed. For example, the display device determines whether a last row of the display device has been addressed with image data values and activated. If not, the display device (at box 788) switches to a next set of pixels, such as a next row of the pixel array 112 and repeats the operations of boxes 760-780 to: (1) send a scan signal to move the common intensity value from the data lines/columns to the next set of pixels (box 770); and (2) send an emission signal to the next set of pixels to activate the next set of pixels to emit light at an intensity based on the common intensity value (box 780). If the entire frame of data has been completed, the display device transitions to the operations of box 790.

At box 790, the display device determines whether an additional amount of tilt has been detected. If the additional amount of tilt is detected, the operations of FIG. 7B are performed. If the additional amount of tilt is not detected, at box 795 the display device determines whether a threshold amount of time has elapsed. If the threshold amount of time has not elapsed, the display device repeats the operations of boxes 760-790. If the threshold amount of time has elapsed, the operations of box 742 are performed. Thus, as a result of determining that the additional tilt is not detected before the threshold amount of time is elapsed, the display device returns to the off display mode.

The threshold amount of time can be, for example, a threshold amount of time that has passed since a determined beginning of tilt of the computing device. The beginning of tilt can be the time that the tilting moment begins or the time that the tilting is detected. In some examples, the threshold amount of time is a threshold amount of time that has passed since the time when the computing device tilted by the initial amount. The time when the computing device tilted by the initial amount can be the time that the initial amount of tilt was reached or the time that the initial amount of tilt was detected.

Based on determining whether or not the additional tilt is detected 790 and whether or not the threshold amount of time has elapsed, the display device determines whether to switch power consumption modes from the standby mode to the normal mode. In some examples, in addition to or instead of determining whether the additional tilt is detected, the display device can receive a signal indicating that the display device is to switch from operating in the standby mode to operating in the normal mode as a result of the device detecting user input to wake the display device. In some examples, detecting the user input to wake the display device includes detecting that the device has been tilted in a manner that satisfies criteria for waking the display device. If the display device is to not switch power consumption modes, the operations of box 750 are performed again. If the display device is to switch to the normal power consumption mode, the operations of box 700 are performed.

At box 700, a display device operates in a normal mode that is a higher power consumption mode. The display device operates in the normal mode for a first frame of time. For example, the DDIC 106 can receive a signal from the SoC 105 instructing the DDIC 106 to enter a higher power consumption mode. In some examples, the DDIC 106 receives a signal from the SoC 105 indicating that the device 190 has exited a standby mode. In response to receiving the signal indicating that the device 190 has exited the standby mode, the DDIC can determine to operate in the higher power consumption mode.

At box 710, the display device addresses a set of data lines with a corresponding set of image data values, using multiple multiplexers to route the set of image data values to the set of data lines. For example, the DDIC 106 can address the data lines of the pixel array 112 using the multiple multiplexers of the set of multiplexers 114.

At box 720, the display device sends a first scan signal to a set of pixels within the array of pixels via a scan line of the display device, to move the set of image data values from the set of data lines to the set of pixels. For example, the DDIC 106 can send a SCAN signal to the scan drivers 108A to move the set of image data values from the data lines to a single line of pixels of the pixel array 112.

At box 730, the display device sends a first emission signal to the set of pixels via an emission line of the display device, to activate the set of pixels at intensities based on the set of image data values. For example, the DDIC 106 can send EM signals to the EM drivers 108B to activate the single line of pixels of the pixel array 112.

At box 734, the display device determines whether an entire frame of data has been completed. For example, the display device determines whether a last row of the display device has been addressed with image data values and activated. If not, the display device (at box 738) switches to a next set of pixels, such as a next row of the pixel array 112 and repeats the operations of boxes 710-730 to: (1) address the data lines/columns with image data for the next set of pixels (box 710); (2) send a scan signal to move the image data from the data lines/columns to the next set of pixels (box 720); and (3) send an emission signal to the next set of pixels to activate the next set of pixels to emit light (box 730). If the entire frame of data has been completed, the display device transitions to the operations of box 740.

At box 740, the display device determines whether to switch power consumption modes from the normal mode to a standby mode. For example, the display device can receive a signal indicating that the display device is to switch from the normal display mode to the standby display mode or the off display mode as a result of a battery of a device in which the display device is housed being determined to have a power level that fell below a threshold power level. In some examples, the display device determines to transition from the normal display mode to the off display mode in response to determining that an amount of movement of the computing device has not exceeded a threshold amount of movement.

The computing device or the display device located therein may determine to switch to a power consumption mode, e.g., the standby display mode or the off display mode. If the display device is to not switch power consumption modes, the operations of box 700 are performed again. If the display device is to switch to a different power consumption mode, the operations of box 742 or 750 are performed, as shown in FIG. 7A.

Embodiments of the subject matter and the functional operations described in this specification can be implemented in any suitable electronic device such as a personal computer, a mobile telephone, a smart phone, a smart watch, a smart TV, a mobile audio or video player, a game console, or a combination of one or more of these devices.

The electronic device may include various components such as a memory, a processor, a display, and input/output units. The input/output units may include, for example, a transceiver which can communicate with the one or more networks to send and receive data. The display may be any suitable display including, for example, a cathode ray tube (CRT), liquid crystal display (LCD), or light emitting diode (LED) display, for displaying images.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Embodiments may be implemented as one or more computer program products, e.g., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both.

Elements of a computer may include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer may not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method, comprising:
    operating a display, which includes an array of pixels addressed by a set of data lines, in a standby display mode and for a first frame of time, including by:
        addressing each data line in the set of data lines with a common intensity value using multiplexer bypass circuitry;
        sending a first scan signal, to a set of pixels within the array of pixels via a scan line, to move the common intensity value from the set of data lines to the set of pixels; and
        sending a first emission signal, to the set of pixels via an emission line of the display, to activate the set of pixels at intensities based on the common intensity value; and
    operating the display in a normal display mode and for a second frame of time, including by:
        addressing the set of data lines with a corresponding set of image data values, using multiple multiplexers to route the set of image data values to the set of data lines;
        sending a second scan signal, to the set of pixels within the array of pixels via the scan line of the display, to move the set of image data values from the set of data lines to the set of pixels; and sending a second emission signal, to the set of pixels via the emission line of the display, to activate the set of pixels at intensities based on the set of image data values.

2. The method of claim 1, wherein:
a power consumption of the display while the display is operating in the standby display mode is lower than a power consumption of the display while the display is operating in the normal display mode, including as a result of the display addressing the set of data lines using the multiplexer bypass circuitry during the standby display mode instead of addressing the set of data lines using the multiple multiplexers during the normal display mode.

3. The method of claim 1, wherein the common intensity value represents a black intensity value, such that the set of pixels are activated to emit little to no light at the intensity that is based on the common intensity value.

4. The method of claim 1, wherein:
addressing each data line in the set of data lines with the common intensity value using the multiplexer bypass circuitry is performed while the multiple multiplexers are deactivated.

5. The method of claim 4, comprising:
sending a signal to the multiple multiplexers to deactivate the multiple multiplexers while each data line in the set of data lines is addressed with the common intensity value using the multiplexer bypass circuitry.

6. The method of claim 1, wherein each multiplexer of the multiple multiplexers is configured to route image data values to a corresponding subset of data lines within the set of data lines, such that the set of data lines includes multiple subsets of data lines that correspond to the multiple multiplexers.

7. The method of claim 1, wherein:
the multiplexer bypass circuitry includes:
    a set of switches for the set of data lines, such that each data line in the set of data lines is switchable by a respective switch from the set of switches, and
    a common intensity data line connected to all switches in the set of switches; and
addressing each data line in the set of data lines with the common intensity value using the multiplexer bypass circuitry is performed while the common intensity value is provided to the common intensity data line and the set of switches is closed, so that the common intensity value is provided through the set of switches to each data line in the set of data lines.

8. The method of claim 7, wherein:
addressing the set of data lines with the set of image data values is performed while the set of switches is open.

9. The method of claim 7, wherein:
the multiplexer bypass circuitry is configured to enable testing equipment to provide a common testing intensity value to the common intensity data line and through the set of switches to the set of data lines at a facility that manufactures arrays of pixels, without the testing equipment using the multiplexers to route image data values to the set of data lines.

10. The method of claim 1, wherein:
the array of pixels includes pixels of a first color, pixels of a second color, and pixels of a third color;
the set of data lines is structured to provide image data values to the pixels of the first color;
a second set of data lines is structured to provide image data values to the pixels of the second color; and
a third set of data lines is structured to provide image data values to the pixels of the third color.

11. The method of claim 1, wherein:
the set of image data values represents image data values for a row of a frame of image data values.

12. The method of claim 1, wherein:
operating the display in the standby display mode for the first frame of time includes:
    addressing each data line in the set of data lines with the common intensity value using the multiplexer bypass circuitry;
    sending a third scan signal, to a second set of pixels within the array of pixels via a second scan line, to move the common intensity value from the set of data lines to the second set of pixels; and
    sending a third emission signal, to the second set of pixels via a second emission line, to activate the second set of pixels to emit light at the intensity based on the common intensity value; and
operating the display in the normal display mode for the second frame of time includes:
    addressing the set of data lines with a corresponding second set of image data values, using the multiple multiplexers to route the second set of image data values to the set of data lines;
    sending a fourth scan signal, to the second set of pixels within the array of pixels via the second scan line, to move the second set of image data values from the set of data lines to the second set of pixels; and
    sending a fourth emission signal, to the second set of pixels via the second emission line, to activate the second set of pixels at intensities based on the second set of image data values.

13. The method of claim 12, wherein:
operating the display in the standby display mode for the first frame of time includes:
    sending the first scan signal to the set of pixels and sending the third scan signal to the second set of pixels according to a first frequency, and
    sending the first emission signal to the set of pixels and sending the third emission signal to the second set of pixels according to the first frequency; and
operating the display in the normal display mode for the second frame of time includes:
    sending the second scan signal to the set of pixels and sending the fourth scan signal to the second set of pixels according to a second frequency that is higher than the first frequency; and
    sending the second emission signal to the set of pixels and sending the fourth emission signal to the second set of pixels according to the second frequency that is higher than the first frequency.

14. The method of claim 1, wherein:
addressing each data line in the set of data lines with the common intensity value using the multiplexer bypass circuitry is performed while a digital-to-analog converter remains deactivated, such that the common intensity value is not converted during the first frame of time from digital form to analog form using the digital-to-analog converter; and
addressing the set of data lines with the corresponding set of image data values includes converting the image data values from digital form to analog form using the digital-to-analog converter, before the image data values in the analog form are routed to the set of data lines using the multiple multiplexers; or addressing each data line in the set of data lines with the common intensity value using the multiplexer bypass circuitry is performed while a memory device configured to store a frame of data values is deactivated and without any frame of image data values being stored by the memory device, such that the common intensity value is not transferred from the memory device as having been selected from any frame of image data stored by the memory device; and addressing the set of data lines with the corresponding set of image data values includes transferring the corresponding set of image data values while in digital form from the memory device to the digital-to-analog converter, with the set of image data values representing a subset of the frame of image data values.

15. The method of claim 1, wherein:

the multiplexer bypass circuitry is configured to provide the common intensity value from a display device integrated circuit to the set of data lines by bypassing the multiplexers.

16. The method of claim 1, wherein the display comprises a display of a mobile computing device, the method comprising:

detecting that the mobile computing device has tilted by an initial amount, when the display of the mobile computing device is in a sleep mode;

transitioning the display of the mobile computing device to the standby display mode, in response to detecting that the mobile computing device tilted by the initial amount;

detecting that the mobile computing device has tilted an additional amount of tilt by a threshold amount of time; and transitioning the display of the mobile computing device from the standby display mode to the normal display mode, in response to detecting that the mobile computing device has tilted the additional amount of tilt by the threshold amount of time, wherein the mobile computing device is configured to transition the display of the mobile computing device from the standby display mode back to the sleep mode in response to detecting that the mobile computing device did not tilt the additional amount of tilt by the threshold amount of time.

17. The method of claim 16, wherein:

the transitioning the display to the standby display mode includes transitioning the display from an off display mode to the standby display mode; and wherein the method comprises:

determining that an amount of movement of the mobile computing device has not exceeded a threshold amount of movement over a second threshold amount of time, when the display of the mobile computing device is in the normal display mode, and transitioning the display of the mobile computing device from the normal display mode to the off display mode, in response to determining that the amount of movement of the mobile computing device has not exceeded the threshold amount of movement over the second threshold amount of time.

18. The method of claim 16, wherein:

transitioning the display to the standby display mode in response to detecting that the mobile computing device has tilted by the initial amount includes detecting that the mobile computing device has begun tilting, without yet having completed tilting the mobile computing device in a manner that satisfies criteria for transitioning to the normal display mode.

19. The method of claim 16, wherein the threshold amount of time is an amount of time passed since: (i) a determined beginning of a tilt, or (ii) the mobile computing device having tilted by the initial amount.

20. A display device, including:

an array of pixels addressable by a set of data lines;

a display device integrated circuit;

multiplexers configured to route image data values from the display device integrated circuit to the set of data lines; and bypass circuitry configured to provide a common intensity data value from the display device integrated circuit to the set of data lines by bypassing the multiplexers, wherein the bypass circuitry includes:

a set of switches for the set of data lines, such that each data line in the set of data lines is switchable by a respective switch from the set of switches; and a common intensity data line connected to the display device integrated circuit and to all switches in the set of switches, wherein the display device integrated circuit is arranged to:

in a normal display mode, provide the image data values to the multiplexers to be routed to the set of data lines; and in a standby display mode:

provide a bypass-circuitry activation signal to the set of switches to close the set of switches; and provide the common intensity data value to the common intensity data line while the set of switches are closed to route the common intensity data value to the set of data lines, bypassing the multiplexers.

* * * * *

UNITED STATES PATENT AND TRADEMARK OFFICE
CERTIFICATE OF CORRECTION

| | | |
|---|---|---|
| PATENT NO. | : 12,374,284 B2 | Page 1 of 1 |
| APPLICATION NO. | : 18/284442 | |
| DATED | : July 29, 2025 | |
| INVENTOR(S) | : Choi | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 49 days.

Signed and Sealed this
Sixteenth Day of December, 2025

John A. Squires
*Director of the United States Patent and Trademark Office*